J. A. CAMERON.
SHUTTER FOR MOVING PICTURE MACHINES.
APPLICATION FILED MAY 3, 1911.
1,178,780.
Patented Apr. 11, 1916.
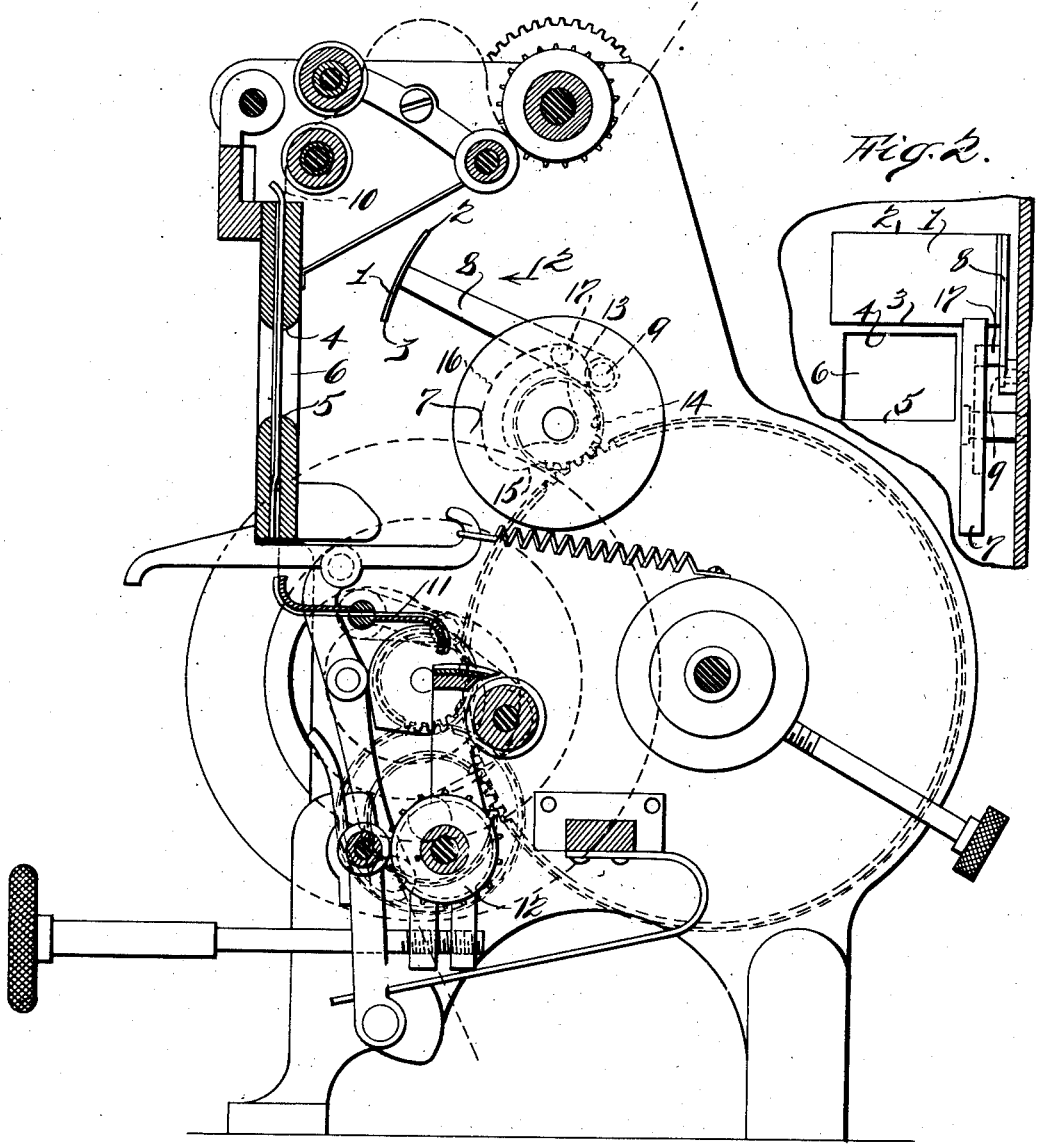

UNITED STATES PATENT OFFICE.

JAMES A. CAMERON, OF BROOKLYN, NEW YORK.

SHUTTER FOR MOVING-PICTURE MACHINES.

1,178,780.  Specification of Letters Patent.  Patented Apr. 11, 1916.

Application filed May 3, 1911. Serial No. 624,817.

*To all whom it may concern:*

Be it known that I, JAMES A. CAMERON, a citizen of the United States, and a resident of the borough of Brooklyn, in the county of Kings and State of New York, have invented certain new and useful Improvements in Shutters for Moving-Picture Machines, of which the following is a specification.

The object of my invention is to eliminate, so far as possible, the objectionable "flicker" which is so much a part of the motion picture machines of the present day, and also to reduce the obscuration, so as to permit the greatest possible amount of light to pass to the screen.

Since the flicker is caused by the alternations of light and darkness, it is manifest that the shorter the period of transposition of the film, and the shorter the period of obscuration (or darkness), the less will be the flicker. It has been proposed heretofore to cut off the light at the proper times by swinging a sector-shaped shutter blade from side to side past the exposure opening, the shutter being moved in one direction past the exposure opening, after one intermittent advancing movement of the film, and back past the exposure opening in the opposite direction after the next intermittent advancing movement of the film. And during that portion of the time in which the film was being shifted, this shutter was held stationary in front of the exposure opening. See Patent No. 610,560 to Parnaland. The period of obscuration in this device was thus equal to the actual time required for shifting the film, (during which time the shutter remained still and covered the exposure opening) plus the time required for moving the shutter away from the exposure opening after the movement of the film had ceased. In my present invention the shutter set forth has a period of obscuration which exists only during the time of the shifting of the film, thus eliminating all possibility of a flicker. I preferably accomplish this by mounting the shutter so as to have a vertical swinging movement up and down past the exposure opening and in providing means for operating the shutter to carry it uninterruptedly down past the exposure opening during the time of one of the intermittent advancing movements of the film and uninterruptedly up past the exposure opening during the next intermittent advancing movement of the film. By reason of this arrangement the period of obscuration is reduced to the lowest possible limit—just the actual time needed for shifting the film from one picture to the next—so that the flicker is practically eliminated. Various means may be utilized for operating the shutter, but in a preferred form this means consists of a cam having first, an active portion to cause the uninterrupted movement of the shutter down past the exposure opening, a dwell to cause the shutter to rest below the exposure opening, a second active portion to produce the uninterrupted movement of the shutter up past the exposure opening, and a second dwell to cause the shutter to rest above the exposure opening.

Another feature of my invention consists, in addition to the foregoing, in providing the shutter with upper and lower edges arranged parallel to the upper and lower edges of the exposure opening and in moving the shutter past the exposure opening so as to maintain its upper and lower edges always in parallelism with the corresponding edges of the exposure opening, thus covering and uncovering the picture squarely across the full width thereof.

Various other objects and features of my invention will appear as the specification proceeds.

In the accompanying drawing I have illustrated a preferred embodiment of my invention, but I would have it understood that various changes and modifications may be made therein without departing from the spirit and scope of the invention. And while the shutter of the present invention is designed particularly for use in connection with the "projector" for exhibiting motion pictures, and is described and illustrated in this connection, it is not necessarily limited to this use, since the features of the invention may be adapted also to the cameras for taking the pictures.

In the drawing: Figure 1 is a side elevation of a preferred embodiment of the invention as applied to a projector of my own design. Fig. 2 is a broken detail view looking in the direction of the arrow 2 in Fig. 1. Like reference characters refer to the same parts in the several views.

In a preferred embodiment, the invention consists of a shutter blade 1, having its upper and lower edges 2 and 3 respectively, arranged parallel to the upper and lower edges 4, 5, of the exposure opening 6 of the machine, together with a cam 7, or other suitable device, for operating the shutter with respect to the exposure opening. The shutter blade is comparatively narrow, preferably as shown, just a trifle wider than the exposure opening itself, and it is so supported that its upper and lower edges will always move in parallelism with the upper and lower edges of the exposure opening. For this reason it is preferably carried by a shutter arm 8, which is supported at one end on a pivot 9, the axis of which is disposed at right angles to the optical axis.

The film (designated 10) is intermittently advanced past the exposure opening by suitable film advancing means. The means illustrated consists of a double ended film advancing guide 11, through which the film passes, and a take up or holding device 12, which winds in and holds the film in advance of the guide.

The shutter-operating cam 7, is driven by suitable gearing and is so timed with respect to the film advancing means that it will move the shutter past the exposure opening once to each action of the intermittent film advancing means. The shape of the cam may vary but preferably it is formed with an active portion 13 for moving the shutter uninterruptedly down past the exposure opening upon one of the intermittent advancing movements of the film, a dwell 14 to hold the shutter below the exposure opening while that particular portion of the film is being exposed, a second active portion 15 to move the shutter uninterruptedly up past the exposure opening upon the next intermittent advancing movement of the film, and a second dwell 16 to hold the shutter above the exposure opening while the next portion of film is being exposed. The cam is operatively connected with the shutter in any suitable way and in the present instance this means of connection consists of a cam roll 17 on the shutter arm which engages in the cam slot.

The two active portions 13 and 15 of the cam are preferably disposed substantially radially of the cam so as to give a quick sharp movement to the shutter when passing the exposure opening. This produces but a very short obscuration and the obscuration movement of the shutter corresponds substantially in point of time with the active movement of the film advancing means. As the time occupied in the shifting of the film is but very short as compared to the time during which the film is being exposed, and as the picture is obscured only during the actual shifting or transposition from one picture to another, it will be apparent that the greatest possible amount of light will pass to the screen. The dwell portions 14 and 16 of the cam are preferably disposed substantially concentric to the center of the cam so as to permit the shutter to remain substantially at rest when in the position either above or below the exposure opening.

What is claimed is:

1. A moving picture machine provided with an exposure opening, means for intermittently advancing the film past said exposure opening, the intermittent advancing movement being of less duration than the period of rest, a shutter operatively disposed with respect to the exposure opening, and means for operating the shutter, said means adapted to uninterruptedly move the shutter past the exposure opening as the film is being advanced, cause the shutter to rest on one side of the exposure opening while that particular portion of film is being paused for exposure, then to uninterruptedly move the shutter up past the exposure opening during the next intermittent advancing movement of the film and to cause the shutter to rest on the other side of the exposure opening while the succeeding portion of film is being paused for exposure, the period of rest of the shutter being in each instance of greater duration than the obscuration stroke.

2. In a moving picture machine provided with an exposure opening, a shutter associated with said exposure opening, operating means for the shutter adapted to carry it back and forth past the exposure opening with an uninterrupted obscuration stroke in each direction and with a dwell between each obscuration stroke of greater duration than the said obscuration stroke, and means for advancing the film past the exposure opening once to each and during each obscuration stroke of the shutter.

3. In a moving picture machine provided with an exposure opening, means for intermittently advancing the film past the exposure opening in such a manner that the pause for exposure is of longer duration than the period of the advancing movement, a shutter, and means for uninterruptedly moving the shutter past the exposure opening in opposite directions, one stroke in one direction being made once to each film advancing movement with a pause after each obscuration stroke of greater duration than the said obscuration stroke so that it will effect a period of obscuration which will exist only during the advancing movement of the film.

Signed at New York city in the county of New York and State of New York this 29th day of April A. D. 1911.

JAMES A. CAMERON.

Witnesses:
PHILIP S. McLEAN,
AXEL V. BEEKEN.